(No Model.)
J. C. SMITH.
BINDER TRUCK.
No. 293,282.  Patented Feb. 12, 1884.
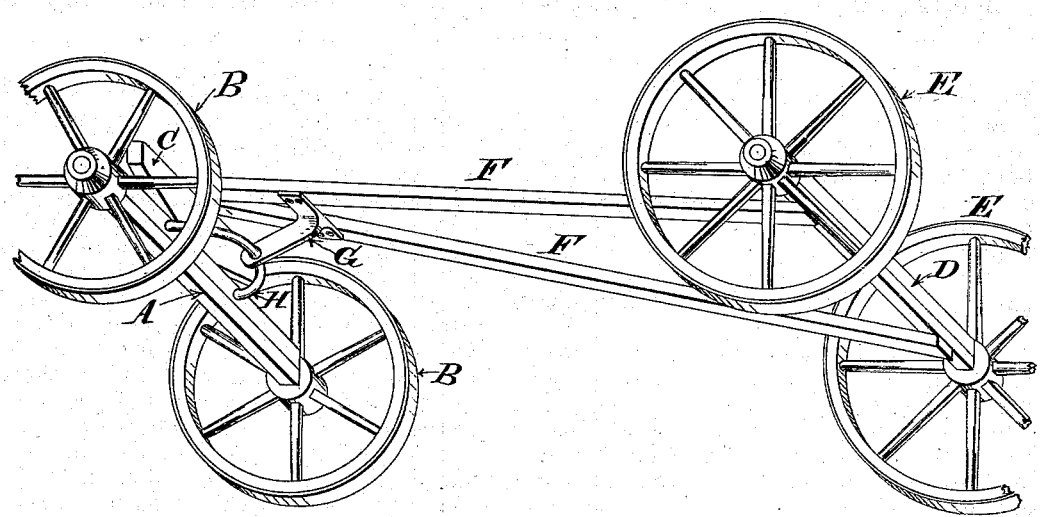
Attest
Carl Spengel
E. W. Rector
Inventor
John C. Smith
by Stem Peer Atty's

UNITED STATES PATENT OFFICE.

JOHN C. SMITH, OF MIAMISBURG, OHIO.

BINDER-TRUCK.

SPECIFICATION forming part of Letters Patent No. 293,282, dated February 12, 1884.

Application filed December 13, 1883. (No model.)

*To all whom it may concern:*

Be it known that I, JOHN C. SMITH, a citizen of the United States, residing at Miamisburg, in the county of Montgomery and State of Ohio, have invented certain new and useful Improvements in Binder-Trucks, of which the following is a full, clear, and exact description, reference being had to the accompanying drawing, forming a part of this specification.

My invention relates to an improvement in that class of trucks which are used for moving harvesters and binders, and which have lately come into general and favorable use for this purpose; and the object of my invention is to provide a truck which shall be simple and cheap in construction, but at the same time of great strength and well braced in all its parts.

The novelty consists in the construction and combination of the parts, as will be herewith set forth and specifically claimed.

The accompanying drawing represents my improved truck in elevated perspective.

A is the front axle, with spindles upon which the forward wheels, B, revolve.

C is the bolster, united to the front axle by a king-bolt in the customary way.

D is the rear axle, provided with spindles, upon which the rear wheels, E, revolve.

F F are the hounds, which, bolted or otherwise secured to the under side of the rear axle, extend forward convergently, and at their united forward ends are connected by the king-bolt to the bolster.

To more firmly unite the hounds and connect them to the front axle, so that the strain will be in a large measure taken off the king-bolt, I employ the pendent brace arm or bracket G, preferably of wrought-iron, which is bolted or otherwise firmly united to the hounds, or either of them, near their forward ends, as shown. This arm is provided with a perforation or eye, through which passes a semicircular staple, H, which is united to and projects from the rear side of the axle A, as shown, and which is preferably of wrought-iron. From this construction it will be seen that the pendent arm G, united to the staple H, in a large measure relieves the king-bolt of the strain that would otherwise come upon it, and also that the front axle can be freely turned to either side by reason of the staple playing through the perforation in the arm G, and that in all positions of the axle this construction above described serves to strengthen and brace the frame and relieve the king-bolt.

I do not limit myself to the precise construction and application of the arm G and staple H; but,

Having thus fully described my invention, I claim—

A binder-truck consisting of the front and rear axles, A D, wheels B E, bolster C, hounds F, the king-bolt uniting the hounds, bolster, and front axle, the pendent arm G, and semicircular staple H, the parts constructed and relatively arranged substantially in the manner and for the purpose specified.

JOHN C. SMITH.

Witnesses:
ADAM CLAY,
FRANK SMITH.